Inventor:
Gunter Schreiber

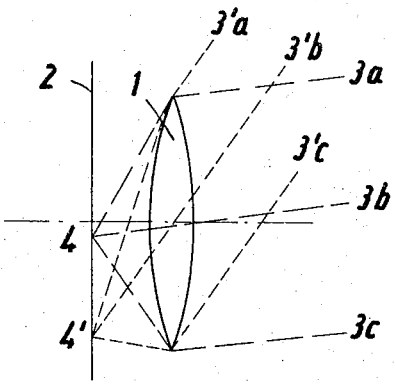
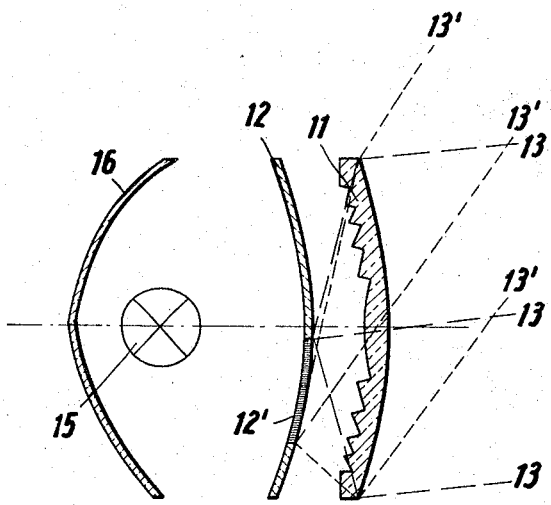

United States Patent Office 3,377,479
Patented Apr. 9, 1968

---

3,377,479
SIGNAL SEARCHLIGHT WITH END PLATE CARRYING OPTICAL DIRECTIONAL MEANS AND WITH DIAPHRAGMS ARRANGED IN THE INNER PATH OF RAYS TO ELIMINATE PHANTOM LIGHT CAUSED BY INNER REFLECTION
Gunter Schreiber, Berlin, Germany, assignor to Sendlinger Optische Glaswerke G.m.b.H., Berlin, Germany
Filed Oct. 12, 1964, Ser. No. 403,096
Claims priority, application Germany, Oct. 18, 1963, S 87,933; Mar. 19, 1964, S 90,113
17 Claims. (Cl. 240—41.3)

ABSTRACT OF THE DISCLOSURE

Disclosed is an improved signal searchlight and end plate for reducing phantom indications, particularly in automobile traffic lights. The end plate includes a lens for directing sunlight incident on the end plate from above a predetermined critical angle to a light absorbing surface within the device. Light emitted from the searchlight is directed past the absorbing surface into an area below the critical angle such that when observed from that area, the end plate is fully and uniformly illuminated.

---

*Disclosure of the invention*

Many, particularly colored, signal searchlights, and especially traffic lights used for controlling street traffic, have the disadvantage that they appear to be illuminated when struck by incident sunlight, even though the light source arranged in their housing is turned off. Consequently, these signal searchlights give a false indication for certain unfavorable positions of the sun relative to the searchlight, caused by the sunlight reflected from the colored elements of the searchlight. This false indication is called a phantom signal or phantom light.

In general, signal searchlights, and particularly traffic lights are equipped with an electric bulb, with a parabolic reflector at whose focal point is arranged a light source, and with an end plate carrying optical directional means consisting of white or colored glass which diffuses the parallel rays issuing from the parabolic reflector to the sides and for some distance. The phantom light has different causes as is known. It is caused first of all by surface reflection on the end plate, and secondly by the fact that light rays hit the reflector from the outside and are reflected by it into the signal searchlight. Elimination of the reflector avoids the phantom light based on the second cause, but this reduces considerably the brightness of the signal. This can be offset only to a minor extent by using a lens as a parallel directing optical part of the searchlight.

A device for protecting against phantom light caused by inner reflection is known, and it consists of two lens screens providing a telecentric path of rays and also consists of a diaphragm screen arranged in the focal plane, the axes of this system being parallel to the beam plane originating from the light source, the light being directed parallel, for example by parabolic reflectors. Consequently, each lens element in the screen next to the light source produces an image of the light source in the associated screen aperture, and each image is again reflected by the associated lens element of the screen remote from the light source as a parallel elementary beam. This reproduction principle naturally also applies to oppositely directed radiation, insofar as it occurs coaxially to the screen remote from the light source.

However, all the rays coming in at an oblique angle to the searchlight axis are not focused and thus collected in the elementary screen apertures, but next to them. This known system is thus suitable for reducing the phantom light, but it requires for the desired lateral and depth-distribution of the parallel reflected light, a diffusing lens, which in turn reduces the effect of the lens screen system, since it deflects the rays coming in from the outside partly into the direction of the system axis. Arrangements are also known which weaken the instant sunlight in its entirety by means of a partly absorbing filter or diffusing lens, thus correspondingly reducing the phantom light. However, due to the reversibility of the optical paths, such a filter plate also weakens the signal light, so that these known arrangements represent at best a compromise between phantom light control and efficiency of the searchlight.

The present invention is based upon the above-mentioned known principle of eliminating the rays coming in from the outside which rays are capable of producing phantom light by inner reflection, through the use of diaphragms arranged in the inner path of rays of the searchlight. However, it provides solutions which in contrast to known devices, do not require a complicated optical system for the effective reflection of signal light into the observation region. The invention makes use of the principle finding that the region where the phantom light producing external radiation, in most cases sunlight, can penetrate into the interior of the searchlight, is only a fraction of the aperture of the searchlight end plate, and in most cases does not coincide with the observation region to be supplied with signal light. The critical region is determined in practice by the highest and lowest position of the sun that may possibly occur at the location of the signal searchlight.

In traffic lights, an angular range of from 7° to 66°, relative to the horizontal is generally assumed for areas at temperate latitudes and in searchlights which are not used for traffic regulation, this angular range is calculated for the desired results, for example, the absence of glare.

Thus, the present invention consists of a signal searchlight with an end plate carrying optical directional means and with diaphragms arranged in the inner path of rays to eliminate the phantom light caused by inner reflection, and is characterized primarily by the fact that the diaphragms are confined to those cross-sectional areas of the end plate aperture which are coordinated with the outer region in which external radiation producing phantom light by inner reflection can occur and that they absorb this internal radiation at least to such an extent that the portion of any transmitted external radiation produces only phantom light from inner reflection whose intensity is below the critical sensitivity of the human eye. The diaphragms can be completely opaque, directed to the above-indicated extent, diffused, or partly transparent.

For practical reasons, the end plate of the searchlight should have an aperture ratio of at least 1:1 and preferably 1:0.2.

With complete illumination of the phantom critical external radiation region, no signal light is transmitted into this region, but this is irrelevant from a practical point of view since traffic signals are almost always used on roads whose inclination is less than 7°.

For steeper uphill roads, it is necessary to use either signal lights with a limited diaphragm transparency according to the foregoing considerations, or signal lights having an end plate with a special optical effect to be discussed below. This makes possible a sufficiently effective signal light for even this type of road. In the theoretically most simple embodiment of the present invention, the diaphragms are arranged in the interior of the searchlight in the focal plane of the end plate lens and are therefore in the path of the signal producing rays. The diaphragm region will be smaller, relative to the size of the lens area, the shorter the focal length, i.e. the greater the aperture ratio of the lens. If it is required, for example, that the diaphragm should only cover 25% of the focal plane, the above-mentioned phantom-critical external region of 7°–66° above the horizontal will produce no phantom light with a lens aperture of 1:0.2. These and even greater apertures can be achieved as known for example by means of Fresnel lenses.

In accordance with one embodiment of the invention, the end plate is composed of a system of several juxtaposed unit lenses, preferably of the Fresnel type, with a diaphragm disc arranged between it and the reflector. The diaphragm disc is at most weakly transparent in those regions in which the unit lenses reproduce the parallel light striking them from the phantom-critical external region. This arrangement has the economical advantage as far as the signal light is concerned, that the traffic signal with the signal light turned on does not present an extensive dark spot. The numerous small diaphragm regions remain inconspicuous due to the halation effect. Particularly effective in this respect is an arrangement where the unit lenses are in a circle or are located on several concentric circles and in which an additional lens is provided in the center of the end plate arranged in the optical searchlight axis which is preferably illuminated directly by the light source. This central unit lens preferably has a greater focal length than the outer unit lenses and the light source is arranged in the focal point of this unit lens. The outer unit lenses can also be combined into a single annular lens.

In order to significantly reduce the losses of direct signal light caused by the diaphragms, the diaphragms are made reflective on their lamp side surfaces, so that the rays falling on them from the light source are reflected toward the reflector. The reflective surface can be arranged so that it reflects the light arriving from the light source onto a region of the reflector which in turn directs this light past the diaphragm.

Instead of arranging the diaphragms as in the embodiments discussed above, transverse to the searchlight radiation directed parallel by the reflector, an improved form of the invention includes arranging the diaphragms parallel to these rays which has the advantage that they are eliminated as a source of phantom light caused by surface reflection. In order to produce the necessary deflection of the critical external radiation reaching the inside of a searchlight, without weaking the issuing signal light, the total reflection on a glass surface inserted at a suitable angle in the radiation range may be utilized for reflection. A practical embodiment of this form of the invention consists in using an end plate provided with a number of parallel, practically horizontal prism elements, as already known for light and signal searchlights, but modified in a novel manner suitable for the invention in such a way that the refracting surfaces of the individual prism elements are so arranged relative to each other and incline toward the horizontal, that at least the portion of the external radiation directed on the surfaces of the prism element remote from the light source at an angle to the horizontal greater than for example 7° (which angle kappa ($\kappa$) is critical for the production of phantom light caused by inner reflection) is completely reflected from the surface of the prism element closest to the light source towards its base or so-called deformation surface. The base is substantially parallel to the searchlight axis and in accordance with the principal feature of the invention has at most a minimum transparency.

The invention is not limited solely to the above-characterized design of a searchlight as a whole, but also to the design of the end plate and the diaphragm plate for such searchlights.

The basic principle of the invention, several embodiments of which also include the last-mentioned variant with total reflection, will now be described more fully in conjunction with the attached drawings in regard to their structural design and optical principles:

FIGURE 1 is a perspective representation of the path of rays through a collective lens, as used in signal searchlights;

FIGURE 2 is a schematic section through a searchlight incorporating the features of the present invention;

FIGURE 3 is a section through a specially designed diaphragm plate;

Figure 4:
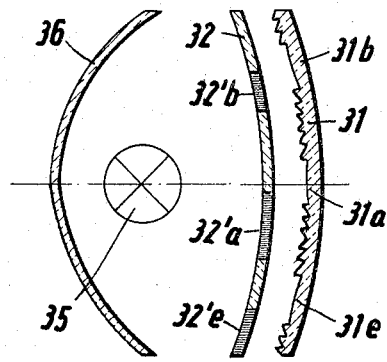
FIGURE 4 is a schematic section through another embodiment of a searchlight incorporating the features of the present invention.

The principal feature of the invention will now be explained in conjunction with FIGURE 1. This figure represents a vertical section through the end plate of a signal searchlight or a part thereof including a collective lens with the focal plane 2, the rays 3a, 3b, 3c, and 3'a, 3'b, 3'c represent the upper limiting ray, the central ray, and the lower limiting ray, respectively of a parallel beam originating from the remote light source, for example the sun. The inclination of the two beams illustrated corresponds to the above-mentioned limiting angles of 7° and 66° above the horizontal for the phantom-critical range of sun positions. The beam 3a–c supplies at point 4 of the focal plane, a sun image and the beam 3'a–c such an image at the point 4'. Between these two points 4 and 4', are the sun images of the other positions of the sun that are possible within the limiting angles. Similar reproduction conditions apply to lateral sun positions so that the total loci of all possible sun images occupy a limited space on the focal plane. According to a basic principle of the invention, this focal plane region is made at least sufficiently absorbent so that any transmitted rays will produce phantom light by inner reflection whose intensity is below the critical sensitivity of the human eye. In the extreme case, this region may be made impervious to the rays.

FIGURE 2 is a schematic representation of a section through a searchlight built in accordance with this basic principle but shows only the end plate 11 serving as an echelon lens, the diaphragm plate arranged on the focal plane of this lens, the light source 15 and the reflector 16. The end plate 11 can have the same surface curvature as the signal plates presently used. The limiting rays in the angular range are from 7°–66° and are designated at 13 and 13'. As can be seen, no external light from within this angular range can fall on the reflector 16 if the diaphragh plate 12 is made impervious to light. It should be pointed out that this is, in practice, naturally a three-dimensional problem. Instead of complete imperviousness, a slight transparency is admissible as mentioned above.

A reduction of the light transmittance through the diaphragm can be achieved for example in a simple manner by providing the diaphragm zone 12' with a coat of light transmittant reducing material. In order not to lose the direct signal light striking this zone 12' on the lamp side, the coating is made highly reflective on that side. As shown in FIGURE 3, it is possible to exert a directional effect on the reflected internal radiation through a suitable shape of the zone 12' such that light originating from the light source 25 is reflected into a region of the reflector 26 which in turn directs the light into a transmissive zone of the diaphragm plate. A diaphragm plate usable in a signal searchlight according to the present invention, can be produced for example by making a transparent disc convex in the zone 12' opaque, such as by pressing, or covering the remaining transparent zones with a mask and subsequently treating the diaphragm plate over its entirety with a light absorbing substance, which because of the mask is only deposited in the zone 12'.

Figure 5:
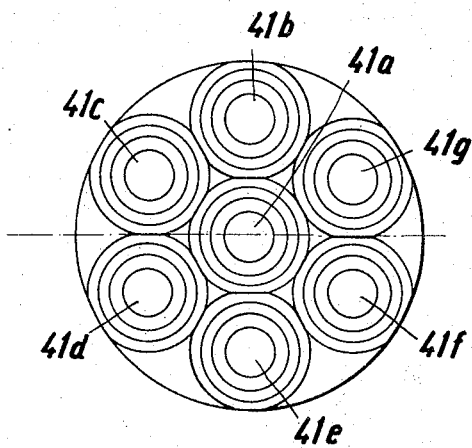
FIGURE 5 is a top view of the end plate shown in FIGURE 4.
Figure 6:
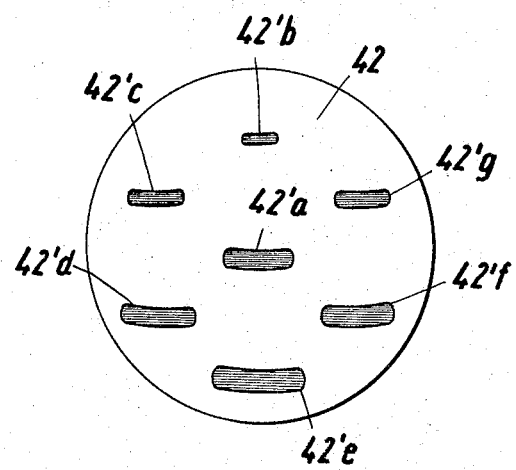
FIGURE 6 is a top view of a diaphragm plate with its opaque regions indicated.

In order to obtain a more uniform illumination of the end plate and to reduce the lens focus with constant aperture ratio, it is advisable to provide the end plate with a number of small unit lenses. FIGURES 4 through 6 show a searchlight with such a multiple lens end plate 31, used with a diaphragm plate 32, the light source 35 and the reflector 36. The end plate 31 is composed according to the embodiment in FIGURE 5 of several echelon lenses 31a through 31g, of which the lenses 31a, 31b, 31e, are shown in section in that figure. In this case, the diaphragm plate 12 has a plurality of masked zones 32'a through 32'g. In FIGURE 6 these zones are shown for a searchlight housing which is provided on its upper side with a hood, known per se, which hood protects the end plate not only against weather and contamination but also keeps sunlight from falling on the upper part of the end plate.

Since the phantom-critical external radiation passing into the searchlight through the central lens first reaches the light source and little reaches the reflector, the above-mentioned short focal length is of minor importance for eliminating phantom light caused by inner reflection. For this reason, the lens can have a greater focal length which is advantageous in that the directional effect of the signal searchlight is considerably increased.

Since, as known, the reflection characteristic of a signal searchlight is determined primarily by the type of reflector, the position of the light source inside the searchlight and the form of the end plate, there are many known signal searchlight constructions adapted in accordance with the many practical requirements which can be made phantom free by using the principles of this invention. Accordingly the invention is not limited to the illustrated form of illuminating the end plates by the light source but can be incorporated in any type of known searchlight independent of the design of the light source and the reflector.

In particular, the illumination of the end plate can be effected by a parabolic, elliptical or spherical reflector with a correspondingly arranged light source. If an elliptical reflector is used, the directional effect of the signal searchlight can be increased if the reflector is composed of several segments and if these segments are so arranged that one focus of each segment coincides with the light source and the other focus with the focus of a certain associated echelon lens of the end plate. In this way, several images of the light source are produced on the diaphragm plate, the light issuing from these images being reflected parallel by the echelon lenses.

Since the reflector formed of several elliptical segments presents difficulties in its manufacture, and such a reflector shows a high stigmatism with a large aperture ratio so that the light source is reproduced in distorted form as a line, it is advisable to design the reflector as a curved surface formed by the rotation of an ellipse about the optical axis of the searchlight. One focus of the ellipse coincides with the light source and the other focus with the focus of an echelon lens of the multiple lens end plate, for example, according to FIGURE 5. In this case, however, instead of the individual outer lenses 41b though 41g, it is possible to use an annular echelon lens which is formed by the rotation of the cross section of the lens 31b as shown in FIGURE 4 about the optical axis of the signal searchlight. In this case, the sunlight is reproduced in the form of a circular ring on the diaphragm plate, which plate must be made impervious to light in this zone to avoid phantom light.

A second embodiment of the invention with the diaphragm zones arranged parallel to the path of rays of the signal searchlight and with totally reflecting deflecting surfaces on the end plate is shown in FIGURES 7 through 10 which illustrate its structural design and optical principles.

Figure 7:
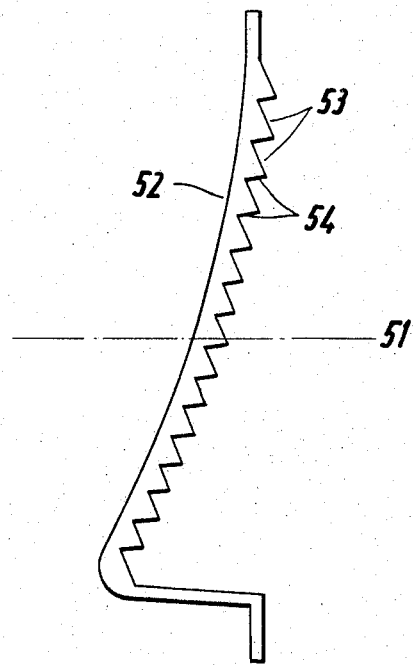
FIGURE 7 is a vertical section through an end plate according to the invention which is provided on the side facing the light source with prism elements.

FIGURE 7 shows the principal form of an end plate with a smooth outer surface 52 and with an inner surface provided with prisms and designed according to this modification of the invention. The individual prisms have totally reflecting surfaces 53 and deformation surfaces 54 equipped with diaphragms. The horizontal searchlight axis is indicated by the dot-dashed line 51.

Figure 8:
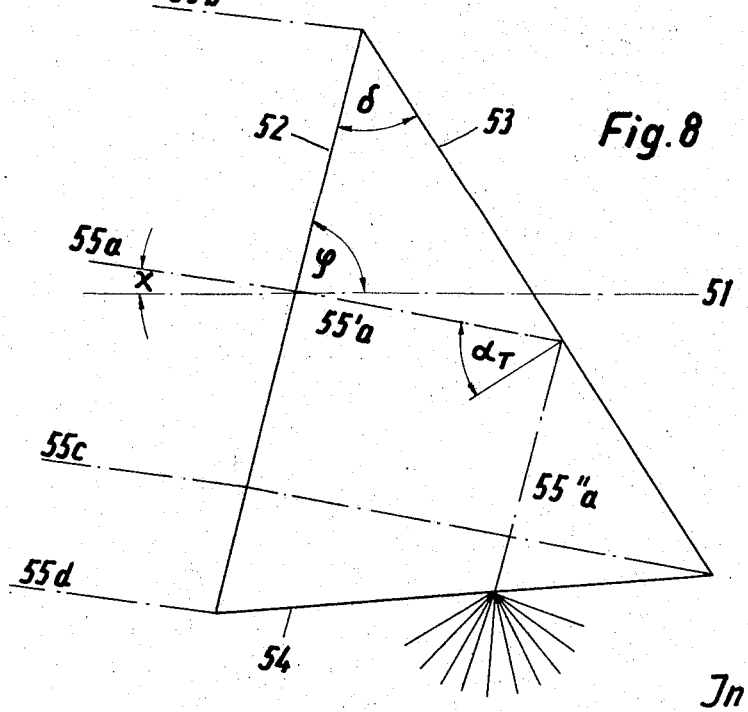
FIGURE 8 is a vertical section through a prism element of the end plate of FIGURE 7 and is shown to an enlarged scale to illustrate the mathematical relations regarding directed rays falling on it from outside the searchlight.
Figure 9:
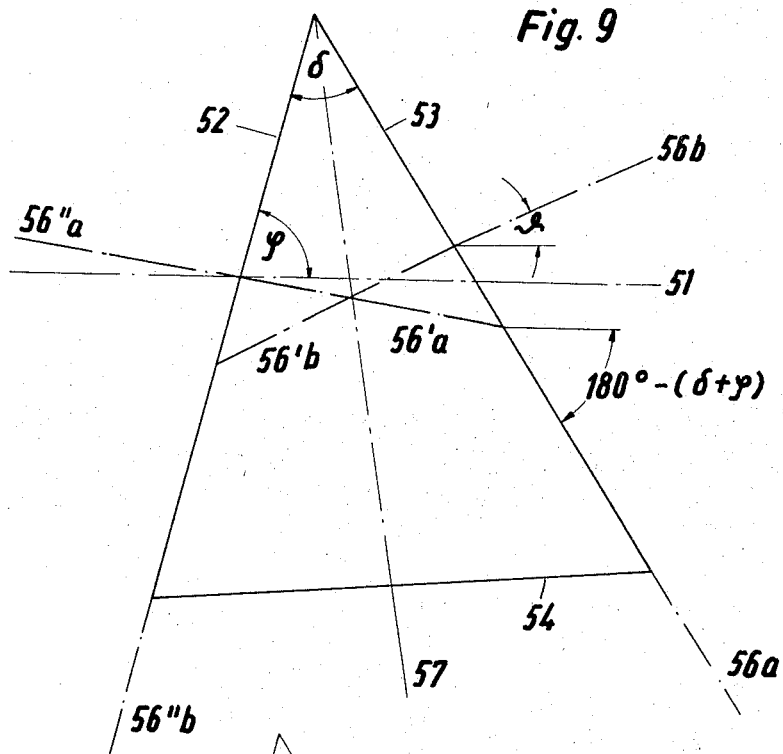
FIGURE 9 is a section similar to FIGURE 8 illustrating the mathematical relationship regarding the outwardly directed searchlight rays.
Figure 10:
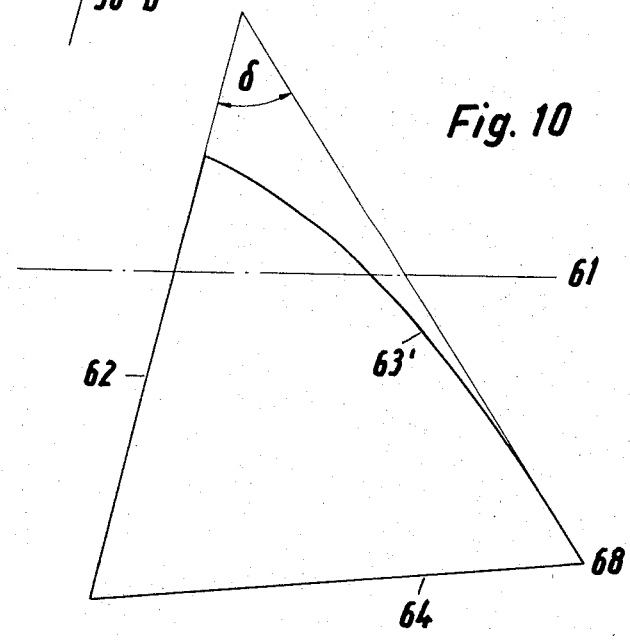
FIGURE 10 shows a modified embodiment of a prism element constructed according to this invention.

FIGURES 8 and 9 illustrate a single prism of such an end plate to an enlarged scale with the outer surface 52 intersecting the surface 53 in order to show the prism angle delta ($\delta$). The outer prism surface 52 forms with the horizontal the angle phi ($\varphi$) and as mentioned above, with the inner prism surface 53 the prism angle delta. The lines 55a through 55d represent those rays of the directed external radiation which are critical for the production of phantom light by inner reflection, for example, those rays of sunlight which hit the searchlight at the smallest critical angle kappa (for example 7°) to the horizontal line 51. The ray 55a is broken at the surface 52, arrives as ray 55'a at the surface 53, is totally reflected at this surface according to the invention, then travels as ray 55"a to the deformation surface 54 and is here at least considerably weakened. This path of travel applies to all external rays parallel to ray 55a which lie between the limiting rays 55b and 55c. No further proof is believed necessary that all directed rays striking on the surface 52 at a larger than the critical angle kappa, for example when the sun stands higher than 7° to the horizontal, are likewise deflected on the inner prism surface with total reflection toward the surface 54. Simple optical considerations show that total reflection of the rays is achieved when the refracting angle $\delta$ of the prism element, the setting angle phi of the outer prism surfaces 52 relative to the horizontal 51, the minimum angle of incidence kappa of the direct external radiation which is critical for the production of the phantom light by inner reflection and the index of refraction $n$ of the prism material are chosen in accordance with the foregoing principles. Prism elements constructed according to these principles optically extinguish the outer range of rays above the critical angle kappa impinging on the searchlight. The embodiment shown and described is based on an index of refraction $n$ of 1.5 which can be realized with commercial glasses.

The external rays striking on the deformation surface 54 are rendered ineffective to produce phantom light by matting the surface or by making it opaque or partly opaque by coating. These methods of obtaining diffuse or directed partial transparency are well known and no further explanation is deemed necessary.

FIGURE 9 illustrates the influence of a prism element according to the present invention on the directed radiation of the signal searchlight issuing from the reflector. As mentioned above, the basic idea of the invention is extinguishing the outer region above the critical angle kappa impinging on the searchlight—in other words—radiating all the light of the searchlight into an observation region which is below the critical angle kappa. The limiting radiation leaving the searchlight just grazes the front face of the end plate. The limiting rays for this region are represented in FIGURE 9 by the lines 56"a and 56"b. In practice, the angle of inclination of the ray 56"a is selected to be somewhat smaller than kappa so as to prevent all radiation energy from entering this limiting region. Accordingly, the searchlight ray 56a producing the limiting ray 56"a which traverses the prism element as ray 56'a, almost grazes the inner prism surface 53. It thus forms theoretically with the horizontal 51 the angle 180°−(delta+phi). The other limiting ray of the beam entering the observation region is produced by the searchlight ray 56b which strikes the prism surface 53 and at an angle theta (ϑ) relative to the horizontal 51, traverses the prism as ray 56'b and leaves as ray 56"b, grazing the outer prism surface 52 that is theoretically at the angle phi relative to the horizontal 51. As can be clearly seen from FIGURE 9, the two paths of rays 56a, 56'a, 56"a and 56b, 56'b, and 56"b are symmetrical to the angle bisector 57 of the angle delta of the prism element. Consequently, in order to meet the requirement of the invention, i.e. illumination of only the observation region between the limiting rays 56"a and 56"b the inner signal light range between the limiting rays 56a and 56b must have the same aperture angle as the illumination range. Within the framework of the invention, the illuminating device can be provided with a light diffusion characteristic which corresponds to the required light diffusion beyond the observation region.

As a rule, the signal should be uniformly recognizable at any point of the observation region. Consequently, the intensity of the signal light will be distributed as is known per se according to the telemetric law, that is the far light will have a greater portion of energy than the near light. The illumination in the near light region which has a lower intensity requires, however, the entire illumination aperture angle (phi+kappa). Obviously, the aperture angle for the far and middle light regions will be smaller than (phi+kappa). However, even with such a smaller illumination aperture than (phi+kappa) signal light can be reflected into the near region if the angle delta of the prism element associated with the near region is increased and this can be done without jeopardizing the elimination of the phantom light caused by inner reflection.

This measure has the advantage as far as the illumination is concerned that the aperture angle of the illumination rays, which can be calculated for the total observation region from the aperture angle (phi+kappa) and which applies to identical prism elements having the prism angle delta, can be reduced by assigning to the near light zone of the observation region, prism elements with a greater prism angle delta. This prism angle can be calculated from the geometry of FIGURES 8 and 9 by substituting a smaller than critical value for angle kappa.

The reduction of the aperture angle of the illumination rays can be carried out within the framework of this invention without dividing the zones of the observation region over different prisms but rather through all prism elements together. To do this, the prism elements are provided with a curved inner surface 63 shown schematically in FIGURE 10. This surface must meet the requirement that its tangent forms at the base root point 68 with the outer prism surface 62 the angle delta and all other tangents applied to surface 63 toward the intersection of this surface with surface 62 must form with the latter an angle which is greater than delta with an angle kappa of critical size.

From the above-mentioned basic idea of the invention of making the external region which is critical for the production of phantom light by inner reflection optically so ineffective that no phantom light can be produced at all by inner reflection or if permitted, remains below the sensitivity threshold of the human eye, it follows that it is also possible to reflect the much more intensive light of the searchlight into regions which lie somewhat above the critical angle of inclination kappa provided the optical values of a part of the prism element are calculated on the basis of a value kappa which is greater than the critical value for that angle. Such a signal searchlight is suitable as mentioned above for uphill traffic roads.

In order to reflect a greater portion of the signal light into a solid angle region above the horizontal the base and deformation surfaces respectively can be made semi-transparent and the illuminating device adapted to the prism elements so that it transmits rays through the partially transparent base and deformation surface of the individual elements into this region. In this case, the illuminating device can be so designed that light reflected from it is partly reflected on the inner prism surface 53 of one prism element and introduced into the base surface 54 of an adjacent prism element.

In general, the illuminating device of this invention consists of a light source, reflector and light diffusion disc, the latter containing prism, scatter, and lens elements. If the invention is applied to color signal searchlights, either the signal end plate can be made of colored material and the light diffusion disc of colored material, or the end plate can be colorless and the light diffusion disc colored.

If no light diffusion disc is used, the end plate in color signal searchlights is made of colored material. In all those cases where the end plate must be made of colored material, one may encounter difficulties in that the color depends on the thickness of the material, and with the arrangement of the phantom-preventing prism elements according to this invention, the end plate can then show different colored tones and dependence on thickness of the prism. In order to eliminate this inconvenience the end plate can consist of a colored outer zone of uniform thickness and of an uncolored zone joined with it, preferably by an optically neutral putty.

The invention is principally independent of the distribution of the prism elements on the end plate and is therefore applicable not only with laminated elements but also with short discreet elements distributed on the plate as they are already known for end plates.

The end plate equipped with the prism elements according to the invention can be planar, convex, or concave and arranged at any angle relative to the horizontal. The embodiment represented in FIGURE 7 relates to a construction which has the advantage that any reflex phantom light produced by reflection is reflected upward, that is not into the observation region. The end plate shown in FIGURE 7 consists of a concave cylindrical surface with a slightly inclined conical surface at the bottom.

It should be added that the portion of the directed external radiation which lies according to FIGURE 8 between the limiting rays 55c and 55d strikes directly on the deformation surface 54 and is absorbed by it or it is diffused or is otherwise made ineffective for the production of phantom light by inner reflection just like the other portion of the directed external light.

If the invention is applied to color signal search lights, a color determining substance can be associated with the end plate or the diaphragm plate or both in a suitable distribution.

I claim:
1. A signal searchlight for reducing phantom indications comprising a lens, a lamp, and a reflector adjacent said lamp for directing light from said lamp onto said lens, screening means in said searchlight for absorbing at least a substantial portion of the light impinging on it, and means on said lens for directing substantially all the light impinging on the outer surface of said lens from an area above a predetermined angle onto said screening means, said light directing means of said lens passing substantially all the light from said lamp outwardly of said searchlight to a second area different from said first area, said screening means being offset from the direct path of all light from said lamp and reflector through said lens to said second area whereby the light from said lamp passes substantially uniformly from said searchlight into said second area.

2. A signal searchlight according to claim 1 wherein said lens comprises an end plate including a system of several juxtaposed lens units, and a diaphragm plate between said end plate and said reflector, said diaphragm plate being least transmissive of light in those regions in which said lens units direct the parallel light striking said lens from said first area.

3. A signal searchlight according to claim 1 wherein said lens has an aperture ratio of at least 1:1.

4. A signal searchlight according to claim 3 wherein said lens has an aperture ratio of about 1:0.2.

5. A signal searchlight according to claim 1 wherein said lens comprises a Fresnel lens system.

6. A signal searchlight according to claim 1 wherein said lens comprises a series of lens units arranged in at least one circle, and an additional lens unit on the optical axis of the searchlight illuminated directly from said lamp.

7. A signal searchlight according to claim 6 wherein said additional lens unit has a greater focal length than the lens units of said series, said lamp being located at the focal point of said additional lens unit.

8. A signal searchlight according to claim 7 wherein said series of lens units are integrally joined to form an annular lens system.

9. A signal searchlight according to claim 1 including a diaphragm plate between said lens and said reflector, said diaphragm plate having absorbing areas facing said lens in those regions where said lens directs parallel light striking said lens from said first area, said diaphragm having reflecting areas facing said reflector corresponding to said absorbing areas, said reflecting areas reflecting light from said lamp to locations on said reflector such that it is deflected past said areas.

10. A signal searchlight according to claim 1 including a diaphragm plate between said lens and said reflector, said diaphragm plate having absorbing areas in those regions where said lens directs parallel light striking said lens from said first area, said diaphragm plate having an increased wall thickness between said areas.

11. A signal searchlight according to claim 1 including a diaphragm plate between said lens and said reflector, said diaphragm plate having absorbing areas in those regions where said lens parallel light striking said lens from said first area, said diaphragm plate having diffusion elements between said regions.

12. A signal searchlight according to claim 1 including a diaphragm plate between said lens and said reflector, said diaphragm plate having absorbing areas in those regions where said lens reproduces parallel light striking said lens from said first area, said diaphragm plate being selectively transmissive between said regions according to the color of the signal.

13. A signal searchlight according to claim 1 wherein said lens comprises an end plate with a plurality of prism elements having their bases almost parallel and substantially horizontal, the surfaces of each prism element being inclined so that substantially all of the external radiation from said first area is totally reflected from the surface of the prism nearest said lamp toward its base, said base being almost parallel to the searchlight axis and being light absorbent to the extent that it weakens this totally reflected light to the extent that it produces internal reflection whose intensity is below the critical sensitivity of the human eye.

14. A signal searchlight according to claim 13 wherein said predetermined angle is 7° above the horizontal and the index of refraction of the material of each prism is approximately 1.5.

15. A signal searchlight according to claim 13 wherein the refracting prism angle $\delta$, the setting angle $\varphi$ of the surface remote from the lamp, and the index of refraction $n$ of the material of the prisms are chosen such that all the light from said lamp striking the surface of said prism closest to said lamp between the angle $180° - (\delta + \varphi)$ and the limiting angle $\vartheta$, pass through said prism into a region between the critical angle $\alpha$ and the angle $\varphi$.

16. A signal searchlight according to claim 15, wherein said lamp and reflector are wholly contained within the area bounded by the angle $\vartheta$ and the angle $180° - (\delta + \varphi)$.

17. A signal searchlight according to claim 13 wherein the surface of said prism nearest said lamp is curved such that a tangent to it at the base of said prism forms the angle $\delta$ with the surface of said prism remote from said lamp, and all other tangents to said nearest surface intersect said remote surface at an angle greater than $\delta$.

References Cited

UNITED STATES PATENTS

| | | | |
|---|---|---|---|
| 990,303 | 4/1911 | Shreiner | 240—106 |
| 1,420,623 | 7/1922 | Coulson | 240—413 |
| 1,443,731 | 1/1923 | Comstock | 240—41.4 |
| 1,443,756 | 1/1923 | Osann | 240—41.4 |
| 1,463,623 | 7/1923 | McCarthy | 240—41.3 |
| 2,463,280 | 3/1949 | Kaehni et al. | 240—106 XR |
| 3,037,419 | 6/1962 | Nixon | 88—60 XR |
| 3,235,863 | 2/1966 | Lockhart | 240—41.3 XR |

NORTON ANSHER, *Primary Examiner.*

C. C. LOGAN, W. M. FRYE, *Assistant Examiners.*

UNITED STATES PATENT OFFICE
CERTIFICATE OF CORRECTION

Patent No. 3,377,479   April 9, 1968

Gunter Schreiber

It is certified that error appears in the above identified patent and that said Letters Patent are hereby corrected as shown below:

Column 4, line 65, "diaphragh" should read -- diaphragm --.
Column 9, line 45, after "lens", first occurrence, insert -- directs --.

Signed and sealed this 9th day of December 1969.

(SEAL)
Attest:

Edward M. Fletcher, Jr.   WILLIAM E. SCHUYLER, JR.
Attesting Officer   Commissioner of Patents